United States Patent [19]

Bäbler

[11] Patent Number: 5,840,901

[45] Date of Patent: Nov. 24, 1998

[54] OXIDATION PROCESS FOR PREPARING QUINACRIDONE PIGMENTS

[75] Inventor: Fridolin Bäbler, Hockessin, Del.

[73] Assignee: Ciba Specialty Chemicals Corporation, Tarrytown, N.Y.

[21] Appl. No.: 910,167

[22] Filed: Aug. 13, 1997

Related U.S. Application Data

[60] Provisional application No. 60/024,085 Aug. 16, 1996.

[51] Int. Cl.[6] .................................................. C07D 471/06
[52] U.S. Cl. .................................. 546/49; 546/56; 546/57
[58] Field of Search ...................................... 546/49, 56, 57

[56] References Cited

U.S. PATENT DOCUMENTS

| | | | |
|---|---|---|---|
| 3,738,988 | 6/1973 | Jackson | 260/279 |
| 4,956,464 | 9/1990 | Bender | 546/57 |
| 5,093,497 | 3/1992 | Schütze et al. | 546/56 |
| 5,223,624 | 6/1993 | Bäbler et al. | 546/49 |
| 5,286,863 | 2/1994 | Bäbler et al. | 546/56 |
| 5,424,429 | 6/1995 | Hendi | 546/49 |
| 5,502,192 | 3/1996 | Ganci | 546/49 |

FOREIGN PATENT DOCUMENTS 54-135821  10/1979  Japan .

OTHER PUBLICATIONS

Production of Quinacridone Pigaments, Toyo Soda Ind./H. Iwamoto, disclosure on Oct. 27, 1981, JP–S56–45512.

*Primary Examiner*—Alan L. Rotman
*Assistant Examiner*—D. Margaret M. Mach
*Attorney, Agent, or Firm*—Kevin T. Mansfield

[57] ABSTRACT

The present invention relates to a process of preparing quinacridone by oxidizing a 6,13-dihydroquinacridone salt corresponding to the quinacridone pigment with hydrogen peroxide as the oxidizing agent. The inventive process is economical and environmentally friendly and yields high performance quinacridone pigments in a high yield.

30 Claims, No Drawings

OXIDATION PROCESS FOR PREPARING QUINACRIDONE PIGMENTS

This application claims the benefit under 35 U.S.C. 119(e) of U.S. Provisional Application No. 60/024,085, filed Aug. 16, 1996.

SUMMARY

The present invention relates to a process for the preparation of quinacridone pigments by oxidation of the corresponding 6,13-dihydroquinacridone using hydrogen peroxide as oxidant.

BACKGROUND

Quinacridone pigments are known for their attractive red and magenta colors and for their outstanding fastness properties. It is well known in the art to prepare quinacridone pigments by oxidizing the correspondingly substituted 6,13-dihydroquinacridone.

For example, numerous publications disclose the oxidation of a 6,13-dihydroquinacridone to the corresponding quinacridone using aromatic nitro compounds as the oxidizing agent in an alcoholic medium containing a base and a small amount of water. However, such processes have the disadvantage of producing considerable organic waste due to the generation of reduced aromatic by-products.

It is also known to oxidize a 6,13-dihydroquinacridone to the corresponding quinacridone by a process wherein the 6,13-dihydroquinacridone is oxidized in a solvent and/or aqueous basic system with an oxygen-containing gas. Such processes are often referred to as "air oxidation" because air is conveniently used as the oxygen-containing gas. Air oxidation processes have the disadvantage that large gas volumes have to be introduced into a heterogeneous reaction mixture, whereby foam is generated. Additionally, it is difficult to determine when the reaction is complete.

Furthermore, it is known to oxidize 6,13-dihydroquinacridones dissolved in polar solvents, for example DMSO, using air as the oxidizing agent. Such processes have the advantage of generating excellent quinacridone pigments in a high yield. However, they have the disadvantage of producing a substantial amount of organic waste, such as dimethylsulfone, as by-product during the oxidation reaction, which requires costly solvent regeneration systems.

The present invention is based on the discovery that the salts of the unsubstituted or substituted dihydroquinacridone (s) are easily oxidized in the presence of a quinone catalyst as a slurry in a basic liquid phase at elevated temperatures using hydrogen peroxide as oxidant.

The inventive process offers the advantage of obtaining the quinacridone product in high yield, substantially free of the starting material. In addition, the crystal modification of the quinacridone product is controlled by the reaction conditions.

The use of hydrogen peroxide as oxidant is additionally advantageous in that it has a high oxidation efficiency at ambient pressure, is readily available and does not generate a reduced organic by-product, as it is the case, for example, with organic nitro compound oxidants. Additionally, if properly selected, the liquid phase can be regenerated by conventional techniques. Thus, the inventive process is valuable in that it provides an economical and environmentally friendly route to produce high performance quinacridone pigments in high yield.

DETAILED DESCRIPTION

The present invention relates to a process for preparing a quinacridone of the formula I

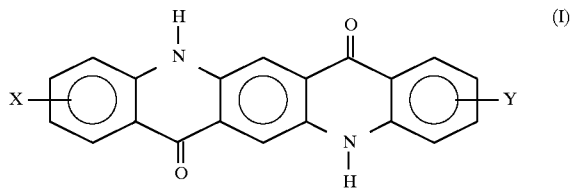

wherein X and Y are independently 1 or 2 substituents selected from the group consisting of H, F, Cl, $C_1$–$C_3$alkyl and $C_1$–$C_3$alkoxy, by the oxidation of a salt of the corresponding 6,13-dihydroquinacridone of the formula II

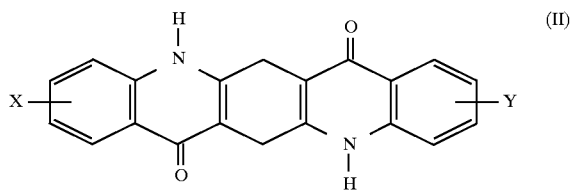

which comprises an oxidation step wherein the 6,13-dihydroquinacridone salt is oxidized with hydrogen peroxide in the presence of a catalyst.

Generally, the salt of the 6,13-dihydroquinacridone of formula II is a mono and/or di-alkali metal salt. Di-alkali metal salts are preferred. Most preferred are the disodium and/or dipotassium salts.

The 6,13-dihydroquinacridone salt is prepared, for example, by stirring the 6,13-dihydroquinacridone in a basic medium, for example a basic mixture of water and alcohol, at a temperature above 30° C., preferably 40° to 60° C., and most preferably between 50° C. and the corresponding reflux temperature, for 5 minutes to 2½ hours, preferably 20 minutes to 1½ hours.

Generally, the oxidation is carried out in a reaction medium obtained by combining a slurry which consists essentially of the 6,13 dihydroquinacridone, the catalyst, a base and a suitable liquid phase, with an aqueous solution of hydrogen peroxide.

In general, a suitable liquid phase is any liquid media which promotes the oxidation reaction, and which does not react to a significant extent with the hydrogen peroxide oxidizing agent.

Commonly, the liquid phase is a mixture of a lower alcohol and water which contains 20 to 750 parts, preferably 40 to 600 parts of water, and 50 to 750 parts, preferably 100 to 600 parts, of alcohol per 100 parts 6,13-dihydroquinacridone; parts being parts by weight.

The alcohol is advantageously a lower alcohol, for example, a $C_1$–$C_3$ alkanol, preferably methanol. The reaction medium is preferably substantially free of other organic solvents. However, organic solvents are tolerated in the reaction medium as long as they do not impair the 6,13-dihydroquinacridone salt generation or the oxidation reaction.

Any base capable of forming the salt of the 6,13-dihydroquinacridone is useful in the reaction medium. Preferably, the base is an alkali metal hydroxide, most preferably sodium or potassium hydroxide. In certain instances, it is advantageous to use a mixture of sodium hydroxide and potassium hydroxide.

The molar ratio of the base to 6,13-dihydroquinacridone is typically from 1 to 7 moles of base per mole of the 6,13-dihydroquinacridone. Preferably, the reaction medium contains 2.2 to 5 moles of base per mole of the 6,13-dihydroquinacridone.

The generation of the 6,13-dihydroquinacridone salt is observable under the light microscope by the formation of crystals of the 6,13-dihydroquinacridone salt. Depending on the reaction conditions, the kind of base and/or the substituents on 6,13-dihydroquinacridone, the salt is generally in the form of needles, prisms, cubes or platelets.

For safety reasons and to avoid potential side reactions as well as for a more controllable process, the oxidation reaction is preferably carried out under an inert gas flow, for example a nitrogen flow.

In an optimized process, the oxidation is carried out by combining an aqueous solution of the hydrogen peroxide oxidant with a slurry of the 6,13-dihydroquinacridone in a basic mixture of aqueous alcohol and base over a time interval of from 5 minutes to 6 hours, preferably over 30 minutes to 3½ hours, and subsequently maintaining the reaction medium at an elevated temperature with stirring for a period of time to complete the oxidation and promote pigment recrystallization. Preferably, the reaction medium is maintained at a temperature above 50° C., preferably at reflux temperature for from 5 minutes to 5 hours, preferably 30 minutes to 4 hours, after the addition of the hydrogen peroxide. The pigment is then isolated by filtration, washing with alcohol followed by hot water and drying. The base and the alcohol can be easily regenerated from the filtrate.

The aqueous solution of hydrogen peroxide generally contains from 1 to 50 weight-percent, preferably 5 to 30 weight-percent, and most preferably 10 to 25 weight-percent, of hydrogen peroxide.

The oxidation of the 6,13-dihydroquinacridone salt to the corresponding quinacridone by hydrogen peroxide is visually followed by the color change of the reaction mixture.

In general, a small excess of the hydrogen peroxide is used. The molar ratio of hydrogen peroxide to 6,13-dihydroquinacridone is, for example, 1.1 to 5 moles, preferably 1.2 to 3.5 moles, of hydrogen peroxide per mole of the 6,13-dihydroquinacridone.

The presence of an oxidation-promoting amount of the catalyst during the oxidation step leads to a higher yield of quinacridone. Additionally, the presence of the catalyst under the oxidation conditions described above, results in a quinacridone product that is substantially free of quinacridonequinone, for example containing less than 2.5 percent by weight of quinacridonequinone. However, minor amounts of quinacridonequinone are tolerated in the product as long as its presence does not substantially reduce the saturation of the final quinacridone pigment.

Any compound capable of catalyzing the oxidation of 6,13-dihydroquinacridone under the present reaction conditions can be utilized as the catalyst. Particularly suitable catalysts used in the inventive process are, for example, the quinone compounds used for the air oxidation of 6,13-dihydroquinacridone to quinacridone. Such quinone catalysts are well-known in the art. In particular, suitable catalysts include anthraquinone compounds, especially anthraquinone, and anthraquinone sulfonic acid derivatives, such as anthraquinone-2,6-disulfonic acid or preferably anthraquinone-2-sulfonic acid, or salts thereof, in particular the sodium or potassium salts, especially anthraquinone-2-sulfonic acid, sodium or potassium salt. The quinone catalyst is present in the reaction medium in an amount effective to catalyze the oxidation reaction, for example from 0.005 to 0.1 times the weight of 6,13-dihydroquinacridone, and most preferably 0.01 to 0.05 times the weight of 6,13-dihydroquinacridone.

Without limiting this invention to any particular theory, it is believed that the quinone catalyst acts to oxidize the 6,13-dihydroquinacridone and is itself reduced to the corresponding leuco compound, which is then regenerated by the hydrogen peroxide.

Depending on the composition of the liquid phase, the recrystallization time and temperature, transparent smaller particle size or opaque larger particle size quinacridone pigments are generated. Lower temperatures and shorter times favor a transparent product, while higher temperatures and longer times favor a more opaque product.

Additionally, it is advantageous to add a particle growth inhibitor before or after the 6,13-dihydroquinacridone salt generation to control the pigment particle size of the oxidized quinacridone pigment. Particle growth inhibitors, also known as antiflocculating or rheology-improving agents, are well known. Suitable particle growth inhibitors include, for example, phthalimidomethylquinacridone, imidazolylmethylquinacridone, pyrazolylmethylquinacridone, quinacridone sulfonic acid and its salts, for example the aluminum salt, or 1,4-diketo-3,6-diphenylpyrrolo[3,4-c]pyrrole sulfonic acid and its salts.

For achieving an optimum effect, the particle growth inhibitor is added in an amount of 0.05 to 8%, preferably 0.1 to 5% based on 6,13-dihydroquinacridone, prior to oxidation, preferably before the 6,13-dihydroquinacridone salt generation.

The instant process is especially useful for the preparation of quinacridone, 2,9-dichloroquinacridone, 2,9-difluoroquinacridone, 4,11-dichloroquinacridone, 2,9-dimethylquinacridone and 2,9-dimethoxyquinacridone.

Additionally, the process is also suitable for the preparation of solid solutions containing one or more quinacridone components. Thus, an aspect of this invention relates to the process wherein a mixture containing two or more 6,13-dihydroquinacridones of formula II which are co-oxidized by the inventive process to yield a quinacridone solid solution product.

The process of this invention is particularly practical for the preparation of quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone or 2,9-dimethylquinacridone/2,9-dimethoxyquinacridone solid solution pigments.

Since the 6,13-dihydroquinacridone salt generation and the oxidation reaction are advantageously carried out sequentially in the same container, practically no handling losses occur. Thus, the process according to this invention provides a quinacridone product in a high yield.

Additionally, the inventive process selectively oxidizes the 6,13-dihydroquinacridone to the corresponding quinacridone easily. The end product normally contains less than 2.5% of the unreacted 6,13-dihydroquinacridone and less than 2.0% of the over oxidized quinacridonequinone. Typically, at least 96%, usually 97.5% and above, of the dihydroquinacridone is converted to the corresponding quinacridone.

Although the oxidation is carried out in a heterogeneous reaction medium, the inventive process provides quinacridone pigments with a narrow particle size distribution. Thus, due to their high purity and desirable narrow particle size distribution, the obtained quinacridone pigments manifest outstanding pigment properties, such as, for example, a high chroma.

The process of this invention is particularly suitable for the preparation of specific crystal modifications of the unsubstituted or substituted quinacridones, for example, the alpha, beta or gamma form of the unsubstituted quinacridone, the beta form of 2,9-dimethylquinacridone and the alpha and/or gamma form of 2,9-dichloroquinacridone.

Different crystal forms of the quinacridone product are generated depending the reaction conditions used, such as, for example, the kind and concentration of base and the composition of the liquid phase, and the kind and concentration of particle growth inhibitors which may be present during the oxidation step. Additionally, the crystal modification of the quinacridone product is controlled by adding from about 1 to 10 percent of seed crystals of quinacridone pigment having the desirable crystal modification. The seed crystals are added preferably prior to the oxidation, most preferably prior to salt formation.

Depending on the end use, it may be advantageous to add texture improving agents and/or rheology improving agents, for example before the isolation of the pigment, preferably by blending into the aqueous presscake. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecanediol-1,2, and also modified colophonium/maleate resins or fumaric acid/colophonium resins or polymeric dispersants. The texture improving agents are preferably added in amounts of 0.1 to 30% by weight, most preferably of 2 to 15% by weight, based on the final product.

Suitable rheology improving agents are for example the above mentioned antiflocculating agents, which are added preferably in amounts of 2 to 10% by weight, most preferably of 3 to 8% by weight, based on the final product.

The present quinacridone and quinacridone solid solution pigments are suitable as coloring matter for inorganic or organic substrates. They are highly suitable for coloring high molecular weight materials, which can be processed to casted and molded articles or which are used in ink and coating compositions such as solvent or water based coatings, for example in automotive coatings.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic polymers such as polyacrylates, polymethacrylates or polyacrylonitrile; rubber; silicone polymers; phenol/formaldehyde resins; melamine/formaldehyde resins; urea/formaldehyde resins; epoxy resins; styrene butadiene rubber; acrylonitrile-butadiene rubber or chloroprene rubber; singly or in mixtures.

Generally, the pigments are used in an effective pigmenting amount, for example, of 0.01 to 30% by weight, preferably 0.1 to 10% by weight, based on the weight of the high molecular weight organic material to be pigmented. Thus, the present invention also relates to a pigmented plastic composition which comprises a plastic material and an effective pigmenting amount of a pigment or pigment solid solution prepared according to a process of the present invention, and to a process for preparing said pigmented plastic compositions.

The present pigments are easily dispersible and can be readily incorporated into organic matrixes to provide homogenous colorations possessing high saturation and excellent light and weather fastness properties.

The high molecular weight organic materials are pigmented with the pigments of the present invention by mixing the pigments, if desired in the form of a masterbatch, into substrates using high shear techniques including roll mills or a mixing or grinding apparatus. The pigmented material is then brought into the desired final form by known methods, such as calandering, pressing, extruding, brushing, casting or injection molding.

The following examples further describe embodiments of this invention. In these examples all parts given are by weight unless otherwise indicated. The x-ray diffraction patterns are measured on a RIGAKU GEIGERFLEX diffractometer type D/MaxII v BX. The surface areas are measured by the BET method.

EXAMPLE 1

A one liter flask equipped with a thermometer, stirrer and condenser is charged with 40 grams 6,13-dihydroquinacridone, 250 ml methanol and 52.8 grams 50% aqueous sodium hydroxide. The mixture is stirred under a slow flow of nitrogen at 50°–55° C. for one hour generating 6,13-dihydroquinacridone di-sodium salt. 0.8 grams anthraquinone-2-sulfonic acid sodium salt are added and the mixture is heated to reflux temperature. 73.5 grams of an aqueous 16.9% hydrogen peroxide solution are added into the reaction mixture with a peristaltic pump at a rate of 0.4 ml/minute maintaining reflux under a slow nitrogen flow over 2 hours and 35 minutes. The resulting reddish suspension is further stirred for 4 hours at reflux then filtered. The presscake is washed with methanol followed by hot water then dried, yielding 38.9 grams red quinacridone.

The product shows a purity of above 98% quinacridone with only 1.7% 6,13-dihydroquinacridone and less then 0.1% quinacridonequinone as determined by a spectrophotometric method.

The x-ray diffraction pattern of the pigment shows the characteristics of a gamma III quinacridone as described in U.S. Pat. No. 5,223,624. A microscopic view of the pigment shows crystals having a prismatic shape with a size generally in the range from 3 to 10 $\mu$m.

When incorporated into plastics the pigment imparts a red color with excellent fastness properties.

EXAMPLE 2

The procedure of Example 1 is repeated; however, adding 0.8 grams of quinacridone mono sulfonic acid aluminum salt as a particle growth inhibitor at the beginning of the process, yielding a gamma III quinacridone in a particle size of 0.8 to 2 $\mu$m. The pigment shows a yellowish red masstone color with a high masstone opacity when rubbed out according to ASTM method D-387-60 in a lithographic varnish.

EXAMPLE 3

A one liter flask equipped with a thermometer, stirrer and condenser is charged with 45 grams 2,9-dichloro-6,13-dihydroquinacridone, 280 ml methanol and 136.8 grams 45% aqueous potassium hydroxide. The mixture is stirred under a slow flow of nitrogen at reflux temperature for one hour generating the 2,9-dichloro-6,13-dihydroquinacridone-di-potassium salt. 0.6 grams of anthraquinone-2-sulfonic acid, sodium salt, are added. 67.6 grams of an aqueous 16.9% hydrogen peroxide solution are added at a rate of 0.3 ml/minute maintaining reflux under a slow nitrogen flow over 3 hours 20 minutes. The resulting bluish-red suspension is further stirred for 4 hours at reflux temperature then filtered at 50°–60° C. The presscake is washed with methanol followed by hot water then dried yielding 44 grams of magenta-colored pigment.

The product shows a purity of 97.9% 2,9-dichloroquinacridone with only 1.8% 2,9-dichlor-6,13-dihydroquinacridone left, as determined by spectrophotometric method. The x-ray diffraction pattern shows a mixture of the alpha and gamma crystal phase with the gamma phase as predominant. An electron micrograph shows pigment crystals in a needle shape predominantly with a length of 1 to 5 μm, a width of 0.1 to 0.6 μm. The pigment product has a specific surface area of 15.5 m²/g.

Incorporated in engineering plastics such as for example ABS the pigment shows a reddish-magenta color with an outstanding heat stability.

EXAMPLE 4

The procedure of Example 3 is repeated; however, adding 0.9 grams quinacridone mono sulfonic acid, aluminum salt, as a particle growth inhibitor at the beginning of the process, yielding an opaque magenta colored 2,9-dichloroquinacridone which manifests an x-ray diffraction pattern with the characteristics of a pure gamma 2,9-dichloroquinacridone. Analyzed by spectrophotometric method the pigment shows a 2,9-dichloroquinacridone content of 97.5% with a 2,9-dichloro-6,13-dihydroquinacridone content of less than 2%. The product has a specific surface area of 18.7 m²/g.

Incorporated in plastics and paints it shows a strong highly saturated magenta color with excellent light and heat stability.

EXAMPLE 5

The procedure of Example 4 is repeated; however, using 2.2 grams phthalimidomethylquinacridone instead of the quinacridone mono sulfonic acid aluminum salt as particle growth inhibitor and instead of 45 grams 2,9-dichloro-6,13-dihydroquinacridone a mixture of 40.5 grams 2,9-dichloro-6,13-dihydroquinacridone and 4.5 grams 6,13-dihydroquinacridone, and by isolating the resulting pigment suspension after 1 hour reflux time instead of 4 hours yielding a magenta colored pigment. The product shows the x-ray diffraction pattern of a small particle size gamma 2,9-dichloroquinacridone with no peaks of the unsubstituted quinacridone present. Thus, it is a solid solution pigment. The product has a specific surface area of 67.6 m²/g.

The pigment provides a strong magenta color shade when incorporated in automotive paints with an outstanding durability.

EXAMPLE 6

A one liter flask equipped with a thermometer, stirrer and condenser is charged with 27 grams 6,13-dihydroquinacridone, 18 grams 2,9-dichloro-6,13-dihydroquinacridone, 0.2 grams quinacridone mono sulfonic acid, aluminum salt, as particle growth inhibitor, 280 ml methanol and 37.2 grams 50% aqueous sodium hydroxide. The mixture is stirred under a slow flow of nitrogen at reflux temperature for one hour generating the corresponding 6,13-dihydroquinacridone-di-sodium salts. 0.6 grams anthraquinone-2-sulfonic acid sodium salt are added. Subsequently, 77 grams of an aqueous 16.8% hydrogen peroxide solution are added at a rate of 0.4 ml/ minute maintaining reflux temperature under a slow nitrogen flow over 2 hours 40 minutes. The resulting bluish-red suspension is further stirred for 1 hour at reflux temperature and then filtered at 50°–60° C. The presscake is washed with methanol followed by hot water then dried yielding 43.8 grams bluish red colored pigment.

The red quinacridone pigment shows the x-ray diffraction pattern of a pigment solid solution, characterized by the following x-ray diffraction pattern:

| scattering angle °2θ | relative intensity % |
|---|---|
| 6.03 | 73 |
| 12.03 | 23 |
| 13.77 | 100 |
| 14.89 | 39 |
| 18.14 | 12 |
| 22.52 | 20 |
| 24.15 | 7 |
| 27.71 | 19 |
| 28.3 | 15 |

EXAMPLE 7

The procedure of Example 1 is repeated; however, adding 40.9 grams 50% aqueous sodium hydroxide instead of 52.8 grams, yielding a beta quinacridone pigment. The product shows a purity of 98.5% quinacridone with only 1.5% 6,13-dihydroquinacridone and less than 0.1% quinacridone-quinone as determined by a spectrophotometric method. The pigment shows a violet masstone color when rubbed out according to ASTM method D-387-60 in a lithographic varnish.

EXAMPLE 8

A one liter flask equipped with a thermometer, stirrer and condenser is charged with 4 grams MONASTRAL Red Y RT-759-D (from Ciba Specialty Chemicals Corp.) as gamma II quinacridone seed crystals, 40 grams 6,13-dihydroquinacridone, 250 ml methanol and 40.9 grams 50% aqueous sodium hydroxide. The mixture is stirred under a slow flow of nitrogen at 50° to 55° C. for one hour generating the corresponding 6,13-dihydroquinacridone-di-sodium salt. 0.6 grams anthraquinone-2-sulfonic acid sodium salt are added and the mixture is heated to reflux temperature. 73.5 grams of an aqueous 16.9% 3hydrogen peroxide solution are added at a rate of 0.4 ml/minute maintaining reflux temperature under a slow nitrogen flow over 2 hours 40 minutes. The resulting red suspension is further stirred for 1 hour at reflux temperature and then filtered at 50°–60° C. The presscake is washed with methanol, followed by hot water and then dried, yielding a gamma II quinacridone as displayed by the x-ray diffraction pattern. The gamma-II quinacridone is described in U.S. Pat. No. 2,844,581.

EXAMPLE 9

A one liter flask equipped with a thermometer, stirrer and condenser is charged with 40 grams 6,13-dihydroquinacridone, 0.1 grams phthalimidomethylquinacridone, 250 ml methanol and 52.8 grams 50% aqueous sodium hydroxide. The mixture is stirred under a slow flow of nitrogen at 50° to 55° C. for one hour generating the corresponding 6,13-dihydroquinacridone-di-sodium salt. 0.6 grams anthraquinone-2-sulfonic acid sodium salt are added and the mixture is heated to reflux temperature. 73.5 grams of an aqueous 16.9% hydrogen peroxide solution are added at a rate of 0.4 ml/minute at reflux temperature under a slow nitrogen flow over 2 hours 40 minutes. The resulting red suspension is further stirred for 1 hour at reflux temperature then filtered at 50°–60° C. The presscake is washed with methanol followed by hot water then dried, yielding a gamma I quinacridone as evidenced by the x-ray diffraction pattern. The gamma-I quinacridone is described in U.S. Pat. No. 3,074,950.

EXAMPLE 10

The procedure of Example 1 is repeated; however, adding 35.8 grams 50% aqueous sodium hydroxide instead of 52.8 grams, yielding an alpha quinacridone pigment. The pigment shows a bright red masstone color when rubbed out according to ASTM method D-387-60 in a lithographic varnish.

EXAMPLE 11

A one liter flask equipped with a thermometer, stirrer and condenser is charged with 45 grams 2,9-dimethyl-6,13-dihydroquinacridone, 280 ml methanol and 90 grams 45% aqueous potassium hydroxide. The mixture is stirred under a slow flow of nitrogen at 50 to 55° C. for one hour generating the corresponding 2,9-dimethyl-6,13-dihydroquinacridone-di-potassium salt. 0.6 grams anthraquinone-2-sulfonic acid, sodium salt, are added and the mixture is heated to reflux temperature. 75.5 grams of an aqueous 16.9% hydrogen peroxide solution are added at a rate of 0.4 ml/minute maintaining reflux temperature under a slow nitrogen flow over 2 hours 45 minutes. The resulting red suspension is further stirred for 1 hour at reflux temperature then filtered at 50°–60° C. The presscake is washed with methanol, followed by hot water and then dried, yielding a beta phase 2,9-dimethylquinacridone crude in a large particle size.

EXAMPLE 12

63.0 grams of polyvinylchloride, 3.0 grams epoxidized soya bean oil, 2.0 grams of barium/cadmium heat stabilizer, 32.0 grams dioctyl phthalate and 1.0 gram of the beta quinacridone prepared according to Example 7 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive violet shade with excellent fastness to heat, light and migration.

EXAMPLE 13

Five grams of the magenta 2,9-dichloroquinacridone pigment prepared according to Example 4, 2.5 grams hindered amine light stabilizer, 1.0 gram benzotriazole UV absorber, 1.0 gram hindered phenol antioxidant and 1.0 gram phosphite process stabilizer are mixed together with 1000 grams of high density polyethylene at a speed of 175–200 rpm for 30 seconds after flux. The fluxed pigmented resin is chopped up while warm and malleable, and then fed through a granulator. The resulting granules are molded on an injection molder with a 5 minute dwell time and a 30 second cycle time at temperatures of 260° C. Homogeneously colored chips which show a bright magenta color with excellent light stability are obtained.

EXAMPLE 14

Six grams of a 2,9-dichloroquinacridone pigment prepared according to Example 3, 9 grams hindered amine light stabilizer, 3 grams benzotriazole UV absorber, and 3 grams hindered phenol antioxidant are mixed together with 1200 grams ABS resin at a speed of 175–200 rpm for 30 seconds after flux. The fluxed pigmented resin is chopped up while warm and malleable, and then fed through a granulator. The resulting granules are molded on a injection molder with a 7 minute dwell time and a 42-second cycle time at temperatures of 232° C. (450° F.) and 288° C. (550° F.) respectively. Homogeneously colored chips which show similar magenta color shades at each of the temperature steps are obtained.

EXAMPLE 15

Preparation of Automotive Paint
millbase formulation

A pint jar is charged with 66 grams acrylic resin, 14.5 grams AB dispersant and 58.1 grams solvent (SOLVESSO 100 from American Chemical). 26.4 grams quinacridone pigment obtained according to Example 2 and 980 grams of 4 mm diameter steel diagonal rods are added. The mixture is milled in the jar for 64 hours on a roller mill. The millbase contains 16.0% pigment with a pigment/binder ratio of 0.5 and a total non-volatile content of 48.0%.
masstone color:

47.3 grams of the above millbase, 36.4 grams of clear solids color solution containing a melamine resin catalyst, non-aqueous dispersion resin and a UV absorber, and 16.3 grams of a balanced clear solid color solution containing a polyester urethane resin are mixed and diluted with a solvent mixture containing 76 parts xylene, 21 parts butanol and 3 parts methanol to a spray viscosity of 20–22 seconds measured by a #2 Fisher Cup.

The red resin/pigment dispersion is sprayed onto a panel twice at 1.5 minute intervals as basecoat. After 2 minutes, clearcoat resin is sprayed twice at 1½ minute intervals onto the basecoat. The sprayed panel is then flashed with air in a flash cabinet for 10 minutes and then "baked" in an oven at 265° F. (129° C.) for 30 minutes, yielding a high chroma red colored panel, with excellent weatherability.

EXAMPLE 16

Automotive Paint Formulation
millbase formulation

A mixture of 130 grams of steatite balls (diameter: 8 mm) and 45.5 grams of a thermosetting acrylic finish, which finish is a mixture of the following composition:

41.3 grams of acrylic resin 16.3 grams of melamine resin 32.8 grams of xylene, 4.6 grams of ethylglycol acetate, 2.0 grams of butyl acetate, and 1.0 grams of silicon oil A, 1% in xylene (BAYER AG).

2.5 grams of the quinacridone pigment solid solution obtained according to Example 5; are dispersed in the above thermosetting acrylic finish in a 200 ml glass flask with a twist off seal on a roll stand over the course of 72 hours; then the steatite balls are separated.
metallic color paint:

8.0 grams of the above millbase, 0.6 grams of aluminum paste, 1.0 grams of methyl ethyl ketone and 18.4 grams of the above mentioned thermosetting acrylic finish are thoroughly mixed and the resulting mixture is sprayed onto aluminum panels and subsequently baked at 130° C. for 30 minutes. Very strong magenta colored metallized coatings having excellent fastness properties are obtained.

EXAMPLE 17

1000 grams of polypropylene granules (DAPLEN PT-55®, from Chemie Linz) and 10 grams of the quinacridone pigment obtained in Example 2 are thoroughly mixed in a mixing drum. The granules so obtained are melt spun at 260°–285° C. to red filaments of good light fastness and textile fibers properties.

In addition to the embodiments described above, numerous variations of these embodiments can be made in accordance with this invention.

I claim:

1. A process for preparing a quinacridone of the formula I

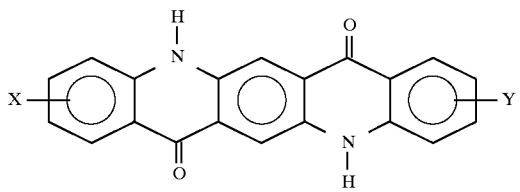

wherein X and Y are independently 1 or 2 substituents selected from the group consisting of H, F, Cl, $C_1$–$C_3$alkyl and $C_1$–$C_3$alkoxy, by the oxidation of a salt of the corresponding 6,13-dihydroquinacridone of the formula II

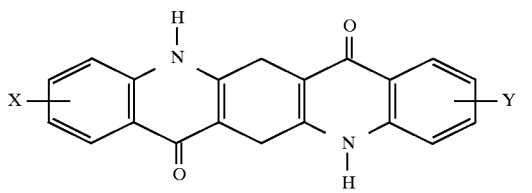

which comprises an oxidation step in a liquid reaction medium wherein the 6,13-dihydroquinacridone salt is oxidized with hydrogen peroxide in the presence of a catalyst in the temperature range from 50° C. to the reflux temperature of the reaction medium.

2. A process of claim 1, wherein the 6,13-dihydroquinacridone salt is an alkali metal salt.

3. A process of claim 1, wherein the 6,13-dihydroquinacridone salt is a disodium or dipotassium salt.

4. A process of claim 1, wherein the oxidation step is carried out by combining a slurry consisting essentially of the 6,13-dihydroquinacridone salt, the catalyst, a base and a liquid phase, with an aqueous solution of hydrogen peroxide.

5. A process of claim 4, wherein the liquid phase consists essentially of from about 20 to 750 parts by weight of water and from about 50 to 750 parts by weight of a lower alcohol per 100 parts by weight of 6,13-dihydroquinacridone.

6. A process of claim 5, wherein the liquid phase consists essentially of from 40 to 600 parts by weight of water and from 100 to 600 parts by weight of the alcohol per 100 parts by weight of 6,13-dihydroquinacridone.

7. A process of claim 5, wherein the alcohol is a $C_1$ to $C_3$ alcohol.

8. A process of claim 7, wherein the alcohol is methanol.

9. A process of claim 8, wherein the 6,13-dihydroquinacridone salt is a di-sodium or di-potassium salt.

10. A process of claim 5, wherein the base is an alkali metal hydroxide which is present in an amount of from 1 to 7 moles per mole of the 6,13-dihydroquinacridone.

11. A process of claim 10, wherein the alkali metal hydroxide is present in an amount of from 2.2 to 5 moles per mole of the 6,13-dihydroquinacridone.

12. A process of claim 11, wherein the alkali metal hydroxide is sodium or potassium hydroxide, or a mixture thereof.

13. A process of claim 10, wherein the catalyst is a quinone compound.

14. A process of claim 13, wherein the catalyst is selected from the group consisting of anthraquinone, anthraquinone monosulfonic acid and anthraquinone disulfonic acid, or a salt thereof.

15. A process of claim 9, wherein the catalyst is anthraquinone-2-sulfonic acid, sodium or potassium salt.

16. A process of claim 13, wherein the catalyst is present in an amount of from 0.005 to 0.1 times the weight of the 6,13-dihydroquinacridone.

17. A process of claim 13, wherein the oxidation step is carried out by combining a 1 to 50 percent by weight aqueous solution of hydrogen peroxide with a slurry consisting essentially of the 6,13-dihydroquinacridone, the catalyst, the base and the liquid phase.

18. A process of claim 17, wherein the aqueous hydrogen peroxide solution has a concentration of 5 to 30 weight percent of hydrogen peroxide.

19. A process of claim 17, wherein 1.1 to 5 moles of the hydrogen peroxide are combined per mole of 6,13-dihydroquinacridone.

20. A process of claim 17, wherein the aqueous solution of hydrogen peroxide is added to the slurry over a time interval of from 5 minutes to 6 hours at elevated temperature and the reaction medium is subsequently maintained, with stirring, at an elevated temperature for from 5 minutes to 5 hours to complete the oxidation and promote pigment recrystallization.

21. A process of claim 20, wherein the reaction medium is maintained at a temperature of from 50° C. to reflux temperature for from 5 minutes to 5 hours.

22. A process of claim 20, wherein the reaction medium is maintained at a temperature of from 50° C. to reflux temperature for from 30 minutes to 4 hours.

23. A process of claim 17, wherein the oxidation step is carried out in the presence of from 0.05 to 10% by weight based on the 6,13-dihydroquinacridone of a particle growth inhibitor.

24. A process of claim 23, wherein said particle growth inhibitor is phthalimidomethyl-, imidazolylmethyl-, pyrazolylmethyl-quinacridone, quinacridone monosulfonic acid and its salts, or a 1,4-diketo-3,6-diarylpyrrolo[3,4-c]pyrrole sulfonic acid, or salt thereof.

25. A process of claim 17, wherein the quinacridone pigment is quinacridone, 2,9-dichloroquinacridone, 2,9-difluoroquinacridone, 4,11-dichloroquinacridone, 2,9-dimethylquinacridone or 2,9-dimethoxyquinacridone.

26. A process of claim 17, wherein the quinacridone pigment is a quinacridone pigment solid solution.

27. A process of claim 17, wherein the quinacridone pigment is a quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/ 2,9-dimethylquinacridone, 2,9-dichloroquinacridone/2,9-dimethoxyquinacridone or 2,9-dimethylquinacridone/2,9-dimethoxyquinacridone solid solution.

28. A process of claim 17, wherein the quinacridone pigment is the alpha, beta or gamma form of unsubstituted quinacridone.

29. A process of claim 28, wherein said gamma form is a gamma-I, gamma-II or gamma-III form of unsubstituted quinacridone.

30. A process of claim 17, wherein at least 96 percent by weight of the dihydroquinacridone is converted to the corresponding quinacridone.

* * * * *